(12) United States Patent
Mutsuno

(10) Patent No.: US 9,395,942 B2
(45) Date of Patent: Jul. 19, 2016

(54) PRINTING APPARATUS, METHOD OF CONTROLLING THE SAME, AND STORAGE MEDIUM

(71) Applicant: CANON KABUSHIKI KAISHA, Tokyo (JP)

(72) Inventor: Masahiro Mutsuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/831,206

(22) Filed: Aug. 20, 2015

(65) Prior Publication Data

US 2016/0062708 A1 Mar. 3, 2016

(30) Foreign Application Priority Data

Sep. 2, 2014 (JP) ................................. 2014-178509

(51) Int. Cl.
*G06F 3/12* (2006.01)
*G06K 15/00* (2006.01)

(52) U.S. Cl.
CPC .............. *G06F 3/125* (2013.01); *G06F 3/1206* (2013.01); *G06F 3/1254* (2013.01); *G06F 3/1297* (2013.01); *G06K 15/4065* (2013.01)

(58) Field of Classification Search
None
See application file for complete search history.

(56) References Cited

U.S. PATENT DOCUMENTS

| 2009/0317120 | A1* | 12/2009 | Miyahara | G03G 15/234 399/82 |
| 2011/0103808 | A1* | 5/2011 | Abe | G03G 15/234 399/16 |
| 2014/0161477 | A1* | 6/2014 | Kurakata | B41J 3/60 399/82 |

FOREIGN PATENT DOCUMENTS

JP 2013033079 A * 2/2013
JP 2005-05186 A 1/2015

OTHER PUBLICATIONS

U.S. Appl. No. 14/821,439, filed Aug. 7, 2015; Inventor: Masahira Mutsuno.

* cited by examiner

*Primary Examiner* — Thomas D Lee
(74) *Attorney, Agent, or Firm* — Fitzpatrick, Cella, Harper & Scinto

(57) ABSTRACT

A printing apparatus selects, based on a number of successive double-sided printing pages following the single-sided printing page, a first print control in which printing of a page which is included in double-sided printing pages and to be printed on a first surface of a sheet and printing of a page which is included in the double-sided printing pages and to be printed on a second surface of the sheet are performed after printing of a single-sided printing page, or a second print control in which printing of the page which is to be printed on the first surface of the sheet is performed before printing of the single-sided printing page and printing of the page which is to be printed on the second surface of the sheet is performed after printing of the single-sided printing page.

6 Claims, 13 Drawing Sheets

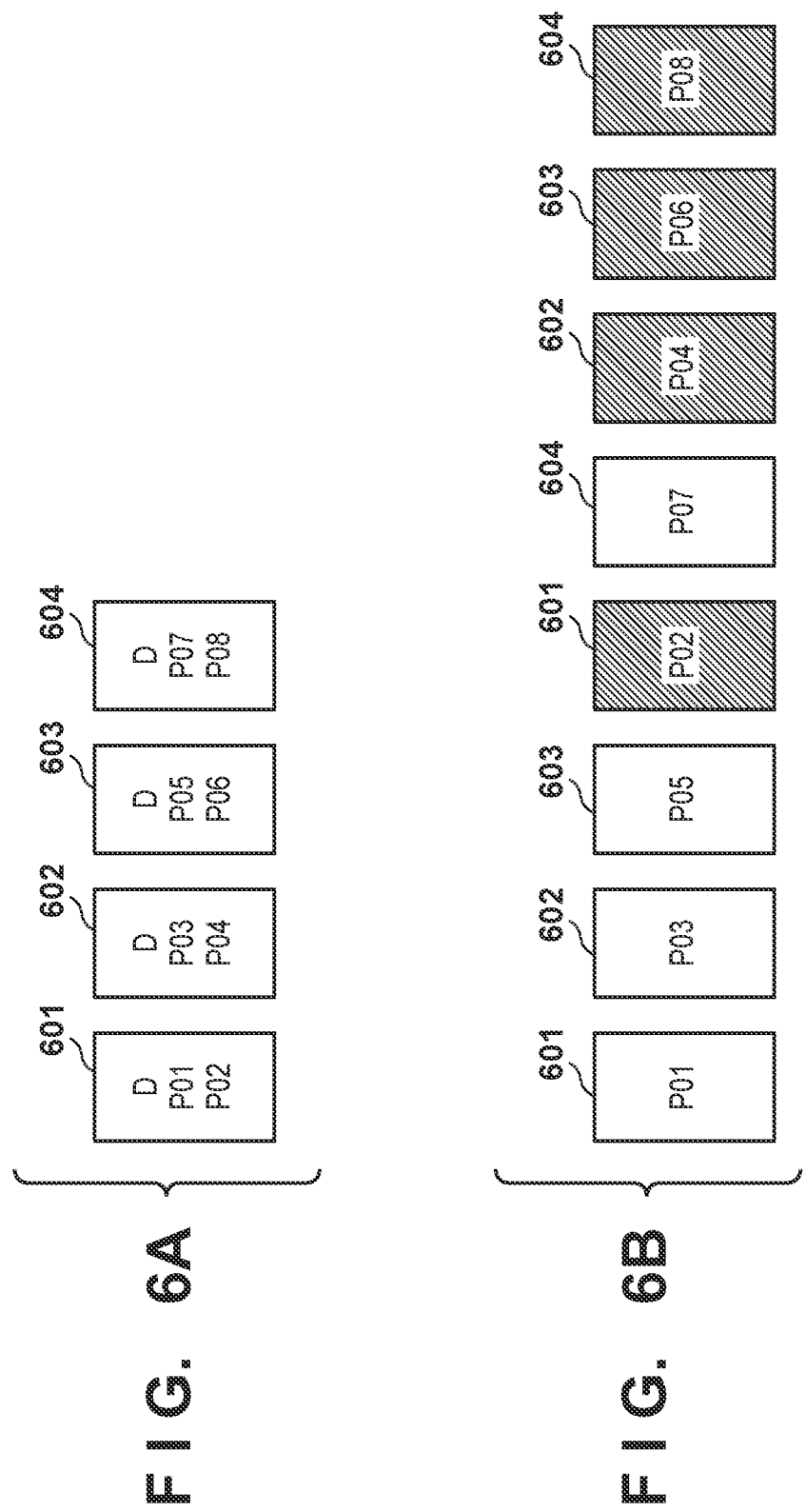

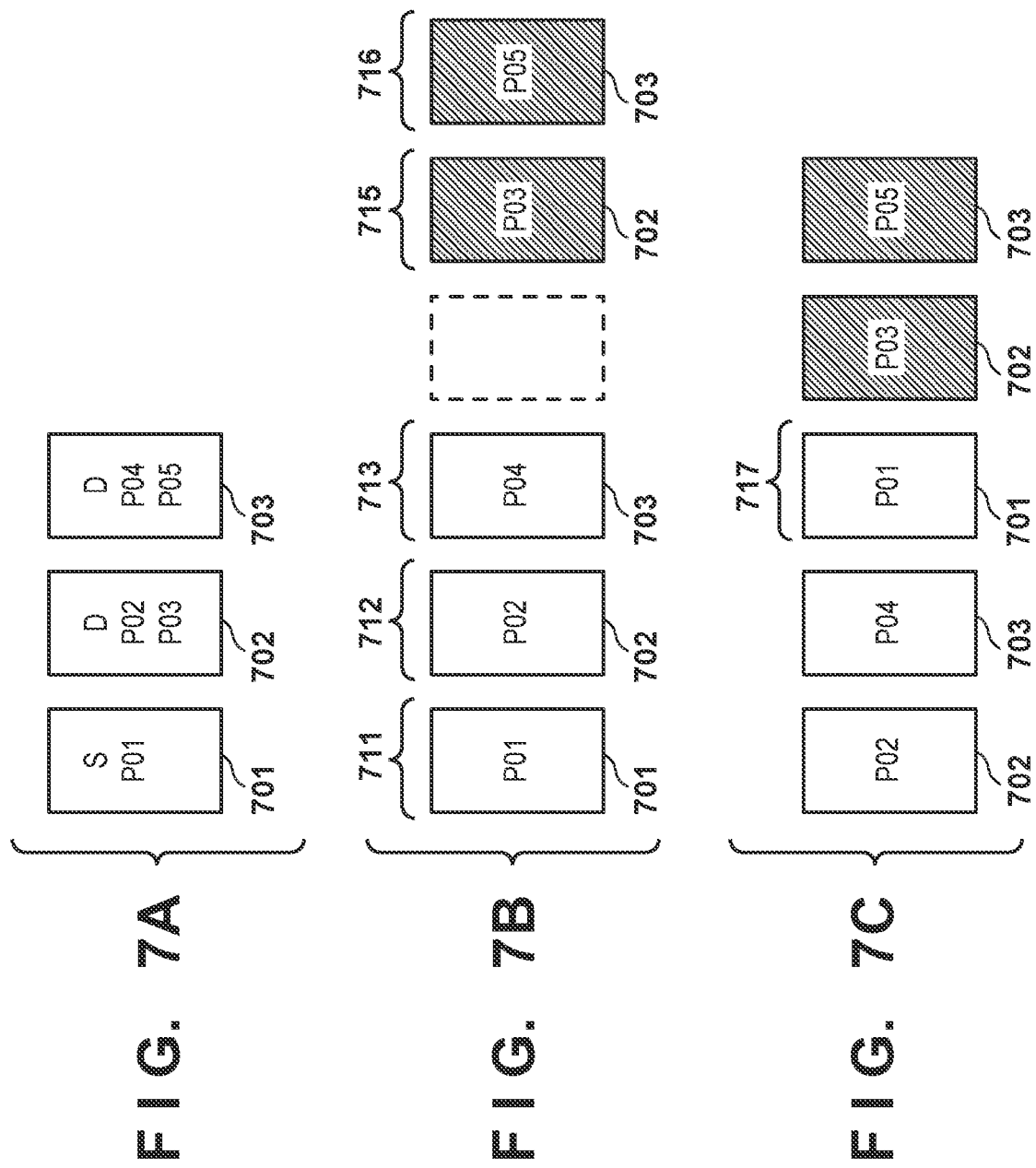

PRINTING APPARATUS, METHOD OF CONTROLLING THE SAME, AND STORAGE MEDIUM

BACKGROUND OF THE INVENTION

1. Field of the Invention

The present invention relates to a printing apparatus, a method of controlling the same, and a storage medium.

2. Description of the Related Art

Conventionally, in the case of an image forming apparatus performing single-sided printing, one side (front side) of a print sheet is printed, and then the print sheet is passed through an inversion mechanism for inverting the print sheet upside down and output with the printed side facing down, so that the page order of the discharged printed matter becomes correct. Also, in the case of performing double-sided printing, the front side of a print sheet is printed, and then the print sheet is passed via a conveyance path for double-sided printing, printed on the back side, and discharged. Also, Japanese Patent Laid-Open No. 2005-15186 discloses an image forming apparatus that performs double-sided printing after selecting a conveyance path that will increase productivity, in the case where there are a plurality of conveyance paths for double-sided printing.

There are print jobs input to an image forming apparatus in which pages for single-sided printing (hereinafter, single-sided printing pages) are mixed with pages for double-sided printing (hereinafter, double-sided printing pages). In the case of such jobs that include a single-sided printing page and double-sided printing pages following the single-sided printing page, changing the order in which the double-sided printing page that is to be printed on the first side of the sheet and the single-sided printing page are printed is known. This involves performing printing on the first side of double-sided printing before printing the preceding single-sided printing page, given that conveyance for inverting the sheet and for performing printing on the second side after printing on the first side of double-sided printing takes time. Changing the order in this way enables the overall printing time to be shortened, because printing of the single-sided printing page that has been deferred can be performed while performing conveyance for inverting the sheet and for performing printing on the second side after performing printing of the first side of double-sided printing. However, in the case where single-sided printing pages are mixed with double-sided printing pages and there are a large number of successive double-sided printing pages, there is a problem in that productivity conversely falls due to the print order being changed in the above manner.

SUMMARY OF THE INVENTION

An aspect of the present invention is to eliminate the above-mentioned problems with conventional technology.

A feature of the present invention is to provide a technique of improving the processing efficiency of print jobs in which single-sided printing pages are mixed with double-sided printing pages.

According to an aspect of the present invention, there is provided a printing apparatus capable of double-sided printing and single-sided printing, comprising: a selection unit that selects, with regard to a print job for including a single-sided printing page and double-sided printing pages following the single-sided printing page, (i) a first print control in which printing of a page which is included in the double-sided printing pages and to be printed on a first surface of a sheet and printing of a page which is included in the double-sided printing pages and to be printed on a second surface of the sheet are performed after printing of the single-sided printing page, or (ii) a second print control in which printing of the page which is to be printed on the first surface of the sheet is performed before printing of the single-sided printing page and printing of the page which is to be printed on the second surface of the sheet is performed after printing of the single-sided printing page, based on a number of successive double-sided printing pages following the single-sided printing page in the print job; and a control unit configured to execute, when a print job for including a single-sided printing page and double-sided printing pages following the single-sided printing page is input, the print job according to the first print control or the second print control selected by the selecting unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A and 6B depict views illustrating an example of the print order in the case of performing double-sided printing of a plurality of pages in the image forming apparatus according to the first embodiment.

FIGS. 7A to 7C depict views illustrating an example do the print order in a "normal mode" of the image forming apparatus according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
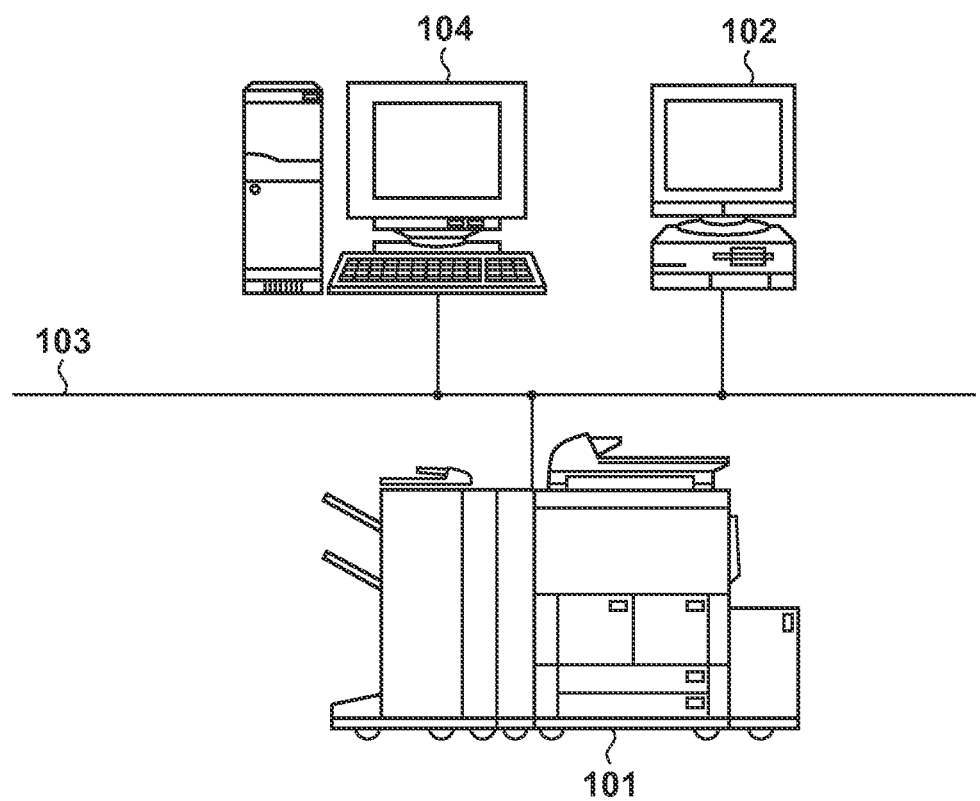
FIG. 1 is a diagram showing an example of a configuration of a printing system that includes an image forming apparatus according to a first embodiment of the present invention.

FIG. 1 is a diagram showing an example of the configuration of a printing system that includes an image forming apparatus 101 according to a first embodiment of the present invention.

PCs 102 and 104 are host computers that transmit print data to the image forming apparatus 101 according to the first embodiment via a network 103. The PCs 102 and 104, apart from the function of transmitting print data to the image forming apparatus 101, start image processing applications and perform processing for editing image data and the like. In this printing system, the image forming apparatus 101 functions as a printing apparatus that prints images using print data received from the PC 102 or the PC 104.

Figure 2:
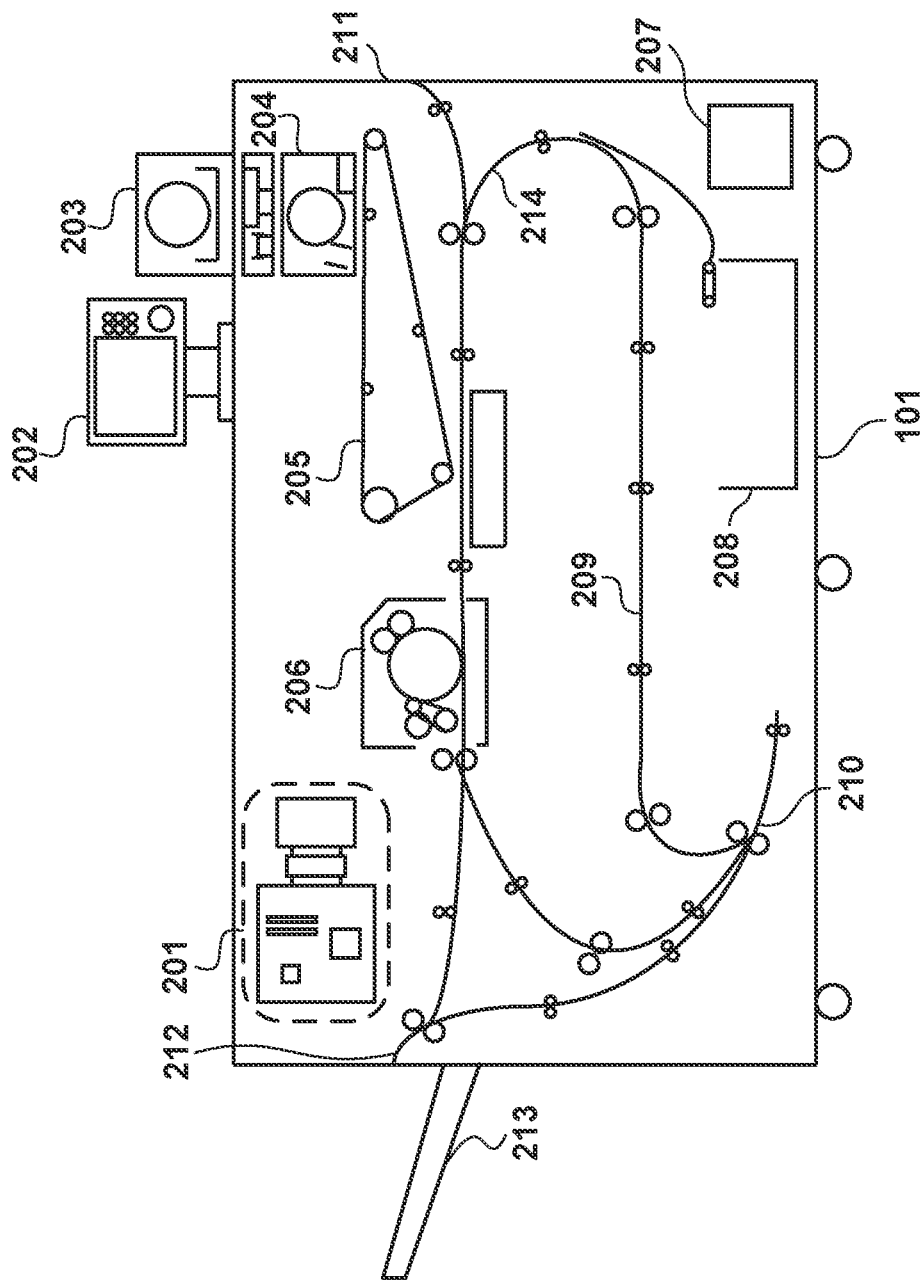
FIG. 2 is a configuration diagram showing an example of the configuration of the image forming apparatus according to the first embodiment.

FIG. 2 is a configuration diagram showing an example of the configuration of the image forming apparatus 101 according to the first embodiment.

A control unit 201 controls the operations of the image forming apparatus 101. A console unit 202 is operated by an operator, and performs processing such as inputting instructions from the operator to the image forming apparatus 101 and displaying menus to the operator. A toner supply unit 203 supplies toner, which is printing material, to an image forming unit 204 of the image forming apparatus 101. This toner supply unit 203 is equipped with a swing door, and the operator can open this door and supply toner. The image forming unit 204 forms an image instructed by the print data using the toner supplied from the toner supply unit 203, and transfers this image to an intermediate transfer belt 205 with a primary transfer unit. The toner image transferred to this intermediate transfer belt 205 is transferred by a secondary transfer unit to a sheet that is conveyed thereto. By sending the sheet to which the toner image has thus been transferred to a fixing unit 206 and applying heat and pressure, the toner image is fixed to the sheet. Toner on the intermediate transfer belt 205 that was not transferred to the sheet is collected and stored by an excess toner collection unit 207.

A sheet fed from a sheet feeding unit 208 is conveyed via a sheet conveyance path 214, has a toner image transferred thereto from the intermediate transfer belt 205 in the secondary transfer unit, and is sent to the fixing unit 206, where the toner image is fixed. A switchback unit 210 inverts the sheet to which the toner image was transferred and fixed upside down. By again conveying the sheet that has thus been inverted upside down to the secondary transfer unit (print point) via a conveyance path 209 for double-sided printing, double-sided printing for forming an image on the back side of the sheet on which image forming has been performed is executed. The paper loading port 211 is a loading port for loading paper into the image forming apparatus 101 from an external sheet feeding apparatus. A paper discharging port 212 is a discharge port for discharging sheets to which a toner image has been fixed into a stack tray 213.

Figure 3:
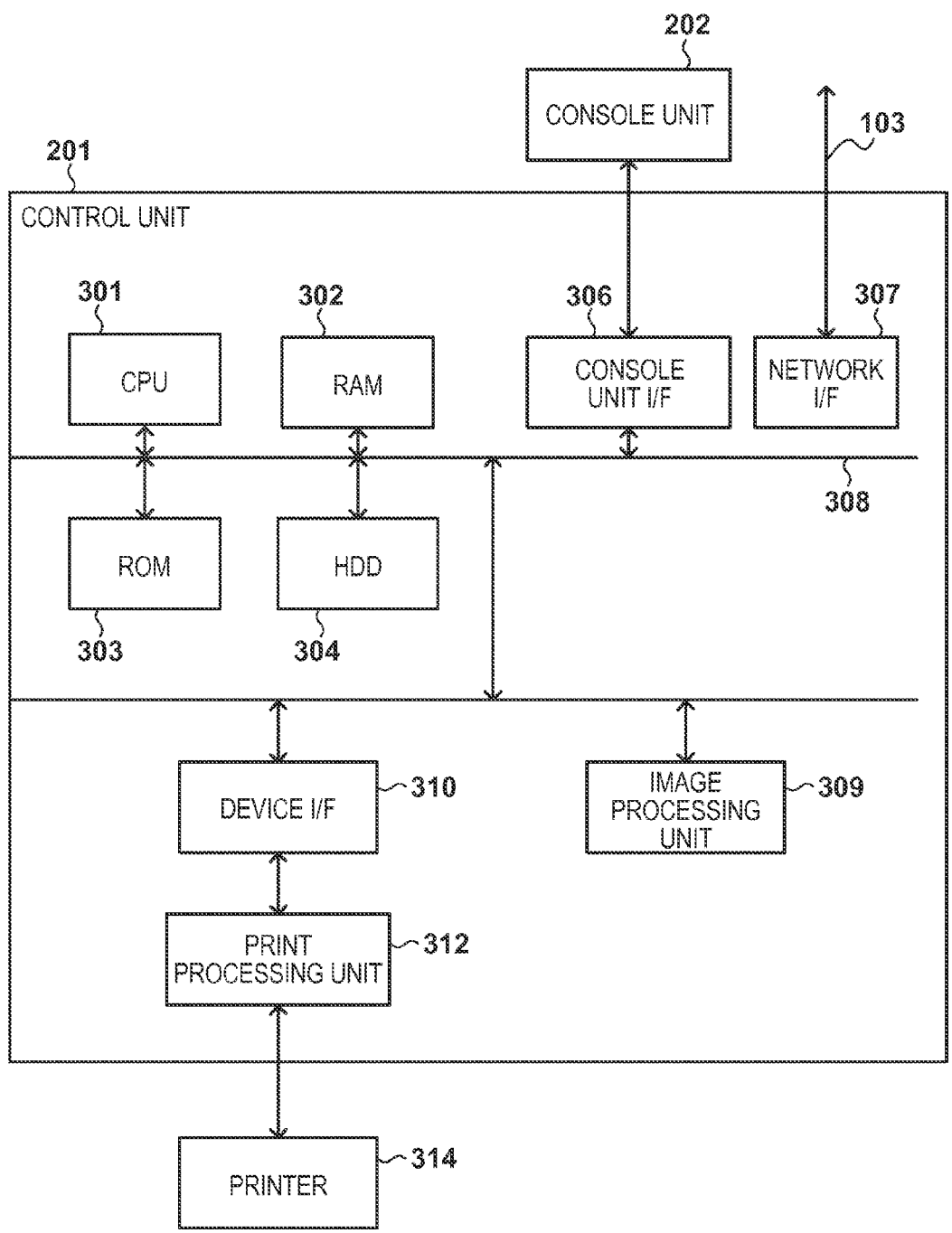
FIG. 3 is a block diagram for describing the configuration of the image forming apparatus focusing on the hardware configuration of a control unit that controls operations of the image forming apparatus according to the first embodiment.

FIG. 3 is a block diagram for describing the configuration of the image forming apparatus 101 focusing on the hardware configuration of the control unit 201 that controls the operations of the image forming apparatus 101 according to the first embodiment.

This image forming apparatus 101 has the control unit 201 that performs overall control, a printer 314 which is an image output device, and the console unit 202 for inputting instructions from the operator and displaying information to the operator. The printer 314 has a configuration such as shown in FIG. 2, is connected to a print processing unit 312, and performs printing in accordance with instructions from the control unit 201.

A CPU 301 is connected to a RAM 302, a ROM 303, a HDD 304, a console unit I/F 306 and a network I/F 307 via a system bus 308. The RAM 302 provides a work area for the CPU 301, and is also used as a settings storage memory for temporarily recording parameter settings, and an image memory for storing a portion of the image data. The ROM 303 is a boot ROM and stores a system boot program. System software, parameter settings history, image data and the like are stored in the HDD (hard disk drive) 304. The CPU 301 realizes processing which will be discussed later by executing the system boot program stored in the ROM 303 at the time of startup, deploying the OS and programs that are installed on the HDD 304 in the RAM 302, and executing these programs. The console unit I/F 306 is an interface that controls input and output between the console unit 202 and the control unit 201, and functions to output instructed image data from the CPU 301 to the console unit 202, and transmit information input by the operator via the console unit 202 to the CPU 301. The network I/F 307 is connected to the network 103, and receives input of information from and outputs information to the network 103. An image processing unit 309 expands PDL code received from the network 103 into bit map data. Also, the image processing unit 309, in the case of performing image processing with the print processing unit 312 and printing with the printer 314, converts compressed and encoded image data stored in the HDD 304 into a format that is usable by the print processing unit 312. A device I/F 310 is for connecting the printer 314 via the print processing unit 312, and performs conversion of image data between synchronous and asynchronous systems and transmission of information such as settings, adjustment values and device status. The print processing unit 312 performs processing such as resolution conversion and color correction according to the printer 314 and processing such as image position adjustment on image data to be printed.

Figure 4:
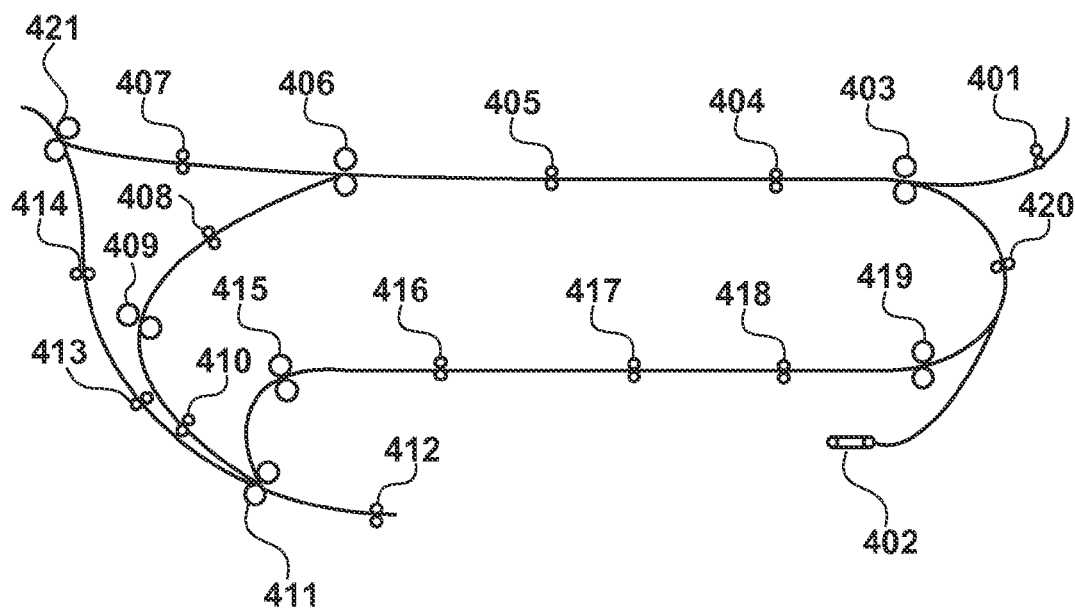
FIG. 4 is a diagram for describing conveyance paths that convey sheets inside the image forming apparatus according to the first embodiment.

FIG. 4 is a diagram for describing conveyance paths that convey sheets inside the image forming apparatus 101 according to the first embodiment.

A reception port 401 is a reception port for loading sheets onto a sheet conveyance path from an external apparatus. Also, a reception port 402 is a reception port for loading sheets onto a sheet conveyance path from the sheet feeding unit 208 (FIG. 2). Sheet conveyance rollers (hereinafter, conveyance rollers) 403 to 421 are provided on the conveyance path in order to convey sheets. The conveyance rollers 403 to 421 are each independently controlled according to the conveyance path of the sheets. Note that the conveyance path including the conveyance rollers 411 and 412 is for performing switchback of sheets, and these conveyance rollers 411 and 412 may counter-rotate. Also, a mechanism for switching the conveyance path that conveys the sheets is provided near the conveyance rollers 406 and 411.

Here, in the case of printing sheets only on one side and discharging the sheets into the stack tray 213 with the printed side facing up, the sheets are conveyed by controlling the rotation of the rollers in order of the conveyance rollers 403 to 407 and 421. In the case of outputting the sheets with the printed side facing up, the following page will be stacked with the printed side facing up on the previous printed sheet when printed in page order. The stack of sheets will thus be in reverse page order. Outputting sheets with the printed side facing up is mainly employed in the case of printing only one sheet.

Next, in the case of printing sheets only on one side and discharging the sheets into the stack tray 213 with the printed side facing down, the sheets are conveyed by controlling the rotation of the rollers in order of the conveyance rollers 403 to 406, 408 to 414, and 421. In this case, the sheets are inverted by the conveyance rollers 408 to 414 inside the image forming apparatus 101, and the sheets can thereby be discharged with the printed side facing down. Here, the path that passes through the conveyance rollers 408 to 414 inside the image forming apparatus 101 is called an inversion path.

Next, in the case of printing sheets on both sides, the sheets are conveyed by controlling rotation of the rollers in order of the conveyance rollers 403 to 406, 408 to 412, 411, 415 to 420, 403 to 407, and 421.

Figure 5:
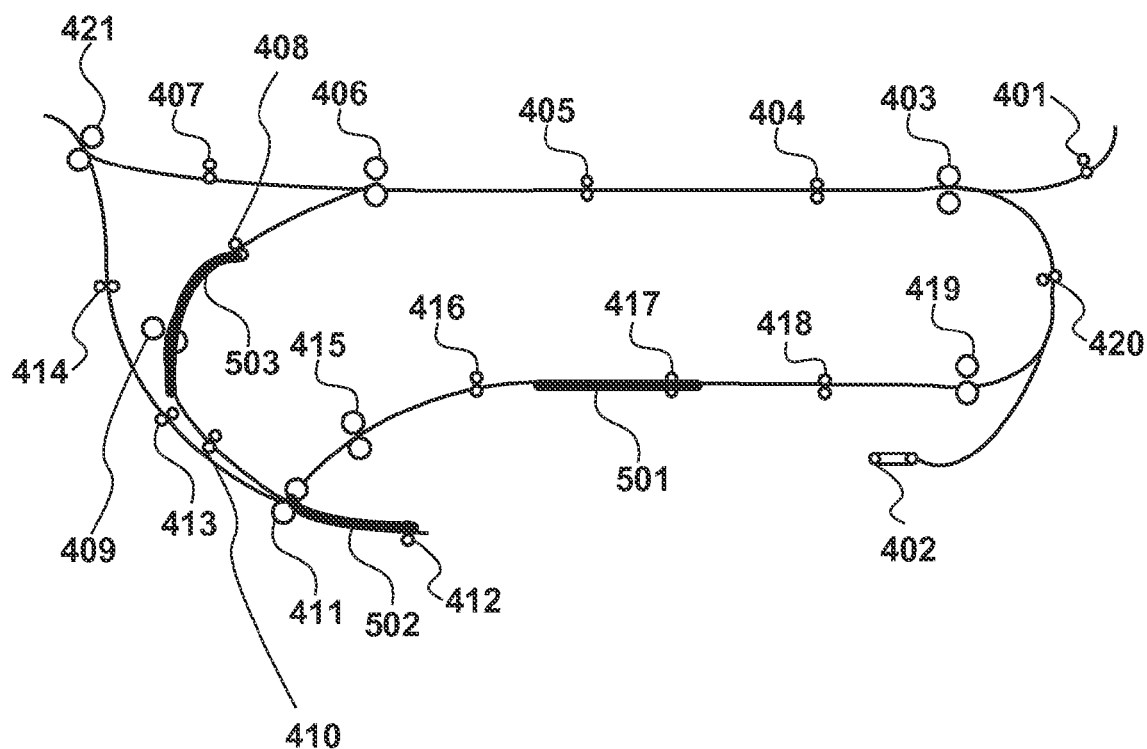
FIG. 5 is a diagram for describing an example in the case where sheets exist at the same time on conveyance paths that convey sheets inside the image forming apparatus according to the first embodiment.

FIG. 5 is a diagram for describing an example in the case where a plurality of sheets exist at the same time on the conveyance paths that convey sheets inside the image forming apparatus 101 according to the first embodiment. Note that, in FIG. 5, portions in common with FIG. 4 are indicated by the same reference numerals.

In the diagram, reference numerals 501 to 503 each indicate a sheet location, and, here, after an image is formed on the front side of a sheet, the sheet stands by in order to form an image on the back side. Note that although a configuration in which there are three standby locations is given as an example here, the number of standby locations may be other than three. In the case of double-sided printing, productivity is enhanced by switching between feeding of sheets for printing on the front side from the reception port 401 or 402 and re-feeding of sheets for printing on the back side thereof as appropriate.

FIG. 6A depicts a view illustrating an example of the correspondence between sheets and pages to undergo double-sided printing. Here, an image (P01) of a first page is to be printed on the front side of a sheet 601, and an image (P02) of a second page is to be printed on the back side of the sheet 601. Similarly, an image (P03) of a third page is to be printed on the front side of a sheet 602, an image (P04) of a fourth page is to be printed on the back side of the sheet 602, an image (P05) of a fifth page is to be printed on the front side of a sheet 603, and an image (P06) of a sixth page is to be printed on the back side of the sheet 603. Furthermore, an image (P07) of a seventh page is to be printed on the front side of a sheet 604, and an image (P08) of an eighth page is to be printed on the back side of the sheet 604.

FIG. 6B depicts a view illustrating the output order of the respective pages when performing printing in the manner shown in FIG. 6A. Here, as shown in FIG. 5, the print order in double-sided printing in the case where a maximum of three sheets are on standby is shown, and the respective pages are printed in the order shown in FIG. 6B. That is, since printing of the front side of the sheets 601 to 603 is performed successively first, resulting in all of three standby locations being filled, the image (P02) is printed on the back side of the sheet 601 which is at the foremost standby location before printing the front side of the sheet 604. The sheet 601 that has thus been printed on the back side is conveyed in the direction of the conveyance rollers 407 rather than in the direction of the conveyance rollers 408, and discharged. Given that one standby location is thereby vacated, the front side of the sheet 604 is printed next. Subsequently, the back sides of the sheets 602 to 604 are printed successively.

Next, a job in which single-sided printing pages are mixed with double-sided printing pages will be described. In the case of executing a job in which single-sided printing pages are mixed with double-sided printing pages, the printed sheets need to be discharged in page order. Sheets that have undergone single-sided printing are discharged via the conveyance roller 421 with the printed side facing down, after being inverted upside down via the conveyance path constituted by the conveyance rollers 408 to 414 as described above. The stack of printed sheets that are discharged will thereby be stacked face down on the discharge tray in order from the first page.

FIG. 7A depicts a view showing an example of the case of single-sided printing the image (P01) of the first page on a sheet 701, double-sided printing the images (P02, P03) of the second page and the third page on a sheet 702, and double-sided printing the images (P04, P05) of the fourth page and the fifth page on a sheet 703.

FIG. 7B depicts a view showing the print order of the respective pages in a normal print mode in the case of performing the printing shown in FIG. 7A. This case is called "normal mode". In the "normal mode", the print order of successive double-sided printing pages is interchanged, whereas the print order of a single-sided printing page and double-sided printing pages is not interchanged.

In FIG. 7B, after first printing the image (P01) of the first page on the sheet 701 at 711, the images (P02, P04) of the second page and the fourth page are respectively printed on the front sides of the sheet 702 and the sheet 703 at 712 and 713. Thereafter, the image (P03) of the third page will be printed on the back side of the sheet 702, although, at this time, the sheet 702 is still being conveyed on the double-sided conveyance path, and printing cannot be performed immediately. Time for one sheet thus needs to be allowed before printing the image (P03) of the third page on the back side of the sheet 702. After this idle time, the image (P03) of the third page and the image (P05) of the fifth page are respectively printed on the back sides of the sheet 702 and the sheet 703 at 715 and 716. In the case of printing the data shown in FIG. 7A, wasted time equivalent to one sheet thus occurs.

In order to eliminate this wastage, a "print order adjustment mode for mixed single-sided and double-sided printing" (hereinafter, print order adjustment mode) is provided in which the printing 711 of the single-sided printing page is executed after printing the front sides of the double-sided printing, as shown in FIG. 7C.

In FIG. 7C, first the image (P02) of the second page and the image (P04) of the fourth page are respectively printed on the front sides of the sheet 702 and the sheet 703, and then, at 717, the image (P01) of the first page is printed on the sheet 701. The image (P03) of the third page will subsequently be printed on the back side of the sheet 702, with the sheet 702 being conveyed on the double-sided conveyance path while printing of the image (P04) of the fourth page on the sheet 703 and then printing of the image (P01) of the first page on the sheet 701 are being performed. Printing of the image (P03) of the third page on the back side of the sheet 702 can thus be performed immediately following printing of the image (P01) of the first page on the sheet 701 (without idle time such as shown in FIG. 7B). In the case where four double-sided printing pages (2 sheets) follow a single-sided printing page, the overall printing is thus completed faster in the print order adjustment mode than in the normal mode.

Figure 8A:
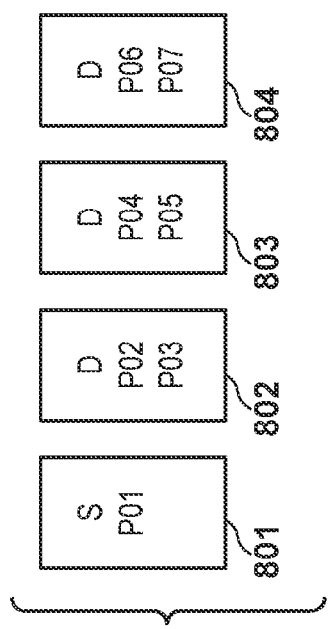
FIGS. 8A to 8C depict views illustrating an example of the print order in a "print order adjustment mode" of the image forming apparatus according to the first embodiment.

FIG. 8A depicts a view illustrating an example of the case of single-sided printing the image (P01) of the first page on a sheet 801, double-sided printing of the image (P02) of the second page and the image (P03) of the third page on a sheet 802, double-sided printing of the image (P04) of the fourth page and the image (P05) of the fifth page on a sheet 803, and double-sided printing of the image (P06) of the sixth page and the image (P07) of the seventh page on a sheet 804.

Figure 8B:
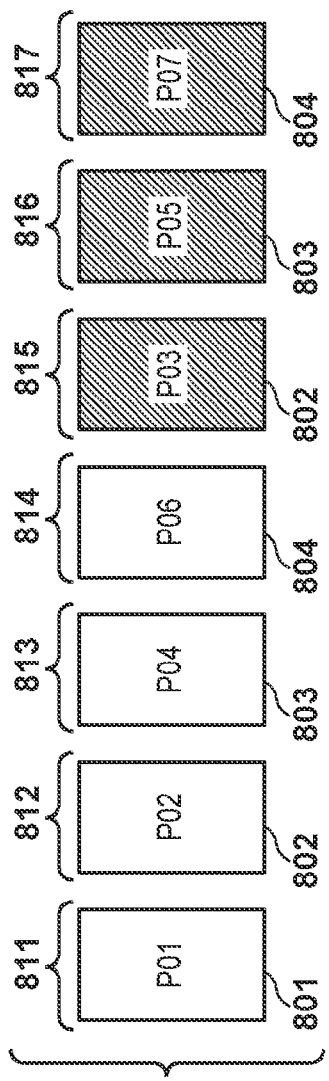

FIG. 8B depicts a view illustrating the print order of the respective pages in the normal mode in the case of performing the printing shown in FIG. 8A. In the normal mode, as mentioned in the description of FIG. 7B, the print order of successive double-sided printing pages is interchanged, whereas the print order of a single-sided printing page and double-sided printing pages is not interchanged.

In FIG. 8B, after first printing the image (P01) of the first page on the sheet 801 at 811, the respective images of the second page, the fourth page and the sixth page are printed on the front sides of the sheets 802 to 804 at 812 to 814. The image (P03) of the third page will subsequently be printed on the back side of the sheet 802 at 815, with the sheet 802 being conveyed on the double-sided conveyance path while the images of the fourth page and the sixth page are being printed on the sheets 803 and 804. Printing of the image (P03) of the third page on the sheet 802 at 815 can thus be performed immediately following printing of the image (P06) of the sixth page on the front side of the sheet 804 (without idle time such as shown in FIG. 7B). After thus printing the image (P03) of the third page on the back side of the sheet 802, the image (P05) of the fifth page and the image (P07) of the seventh page are respectively printed on the back sides of the sheet 803 and the sheet 804 at 816 and 817.

Figure 8C:
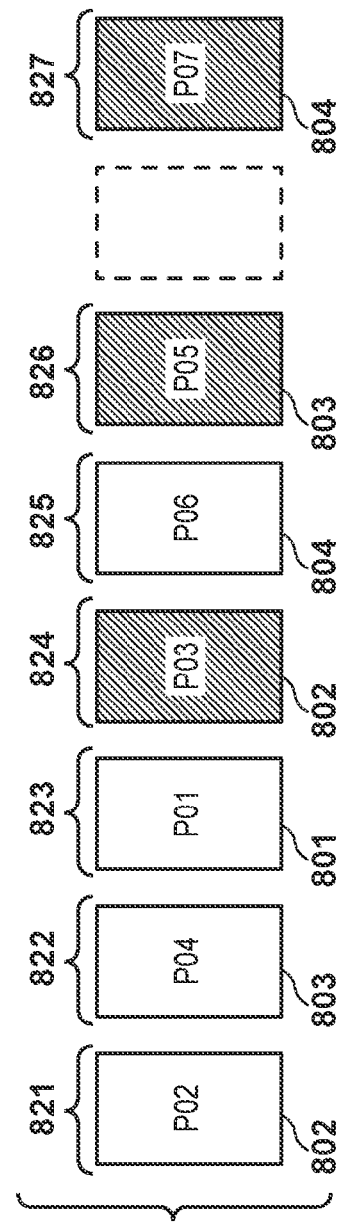

Next, FIG. 8C depicts a view illustrating the print order of the respective pages in the print order adjustment mode in the case of performing the printing shown in FIG. 8A. In FIG. 8C, after respectively printing the image (P02) of the second page and the image (P04) of the fourth page on the front sides of the sheet 802 and the sheet 803 at 821 and 822, the image (P01) of the first page is printed on the sheet 801 at 823. To compare with FIG. 8B, in FIG. 8B, the image (P02) of the second page, the image (P04) of the fourth page and image (P06) of the sixth page are respectively printed successively on the front sides of the sheets 802 to 804. In contrast, in FIG. 8C, after printing the image (P04) of the fourth page on the front side of the sheet 803, the image (P01) of the first page is printed on the sheet 801 at 823, rather than printing the image (P06) of the sixth page on the front side of the sheet 804.

Since three sheet standby locations exist in the image forming apparatus 101, as described above, the front sides of three sheets of double-sided printing can be printed successively, in the case of printing in the normal mode. However, in the case of printing in the print order adjustment mode, one of the three standby locations (sheet location indicated by 503 in FIG. 5) must also be used in order to invert sheets that have undergone single-sided printing. In spite of this, when the image (P02) of the second page, the image (P04) of the fourth page and the image (P06) of the sixth page are respectively printed successively on the front sides of the sheets 802 to 804 as in FIG. 8B, it will no longer be possible to place the sheet 801 on which the image (P01) of the first page has been printed on the conveyance path constituted by the conveyance rollers 408 to 414 next.

In view of this, in the case of performing the printing shown in FIG. 8A in the print order adjustment mode, double-sided printing is performed with one less standby location being used. That is, after respectively printing the image (P02) of the second page and the image (P04) of the fourth page on the front sides of the sheet 802 and the sheet 803 at 821 and 822, the image (P01) of the first page is printed on the sheet 801 for single-sided printing, rather than printing the image (P06) of the sixth page on the front side of the sheet 804 next.

Following the printing of the image (P01) of the first page on the sheet 801, the image (P03) of the third page is printed at 824 on the back side of the sheet 802 which was conveyed on the double-sided conveyance path while printing of the image (P04) of the fourth page on the sheet 803 and printing of the image (P01) of the first page on the sheet 801 were being performed. With this timing, the standby locations will be vacated, since the sheet 801 is conveyed in the direction of the conveyance rollers 413 and 414, and the sheet 802 which has been printed on the back side at 824 is conveyed in the direction of the conveyance rollers 407. The image (P06) of the sixth page can thus finally be printed on the front side of the sheet 804 next at 825.

After thus printing the image (P06) of the sixth page on the front side of the sheet 804, at 826, the image (P05) of the fifth page is printed on the back side of the sheet 803 which was conveyed on the double-sided conveyance path while printing the images (P01, P03, P06) of the first page, the third page and the sixth page. The next to be printed is the back side (P07; 7th page) of the sheet 804, although, at this time, the sheet 804 is still being conveyed on the double-sided conveyance path, and printing cannot be performed immediately. Time for one sheet thus needs to be allowed before printing the image (P07) of the seventh page on the back side of the sheet 804. After this idle time, the image (P07) of the seventh page is printed on the back side of the sheet 804 at 827. In the case of printing in the print order shown in FIG. 8C, wasted time equivalent to one sheet thus occurs. That is, in the case where six double-sided printing pages (three sheets) follow a single-sided printing page, printing in the print order adjustment mode will conversely take more time to complete the overall printing than in the normal mode.

Figure 9:
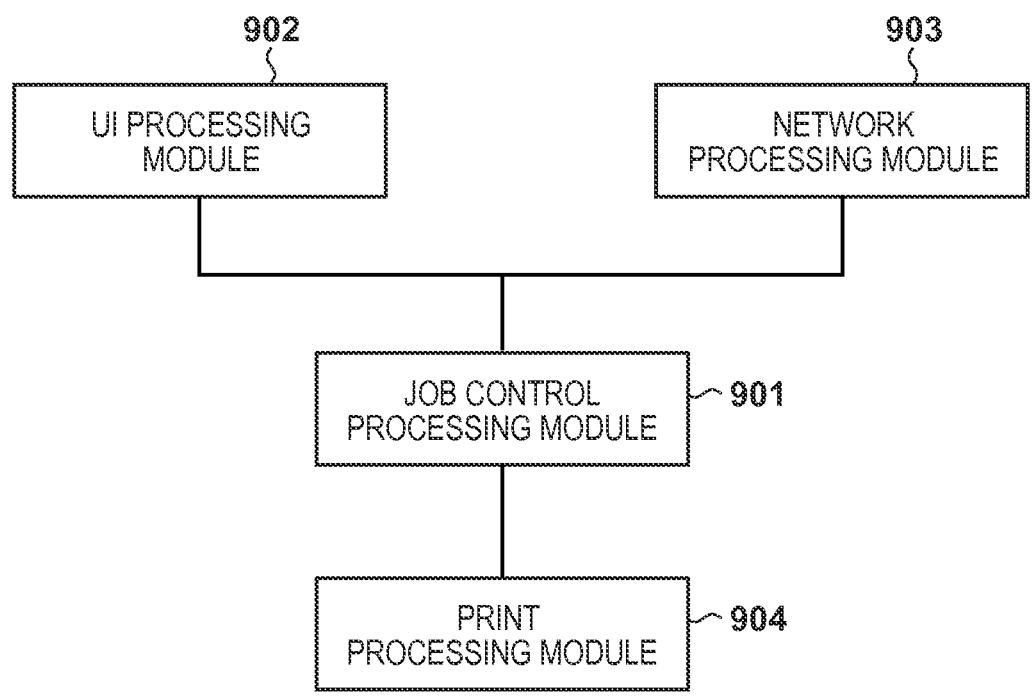
FIG. 9 is a diagram for describing software modules of the image forming apparatus according to the first embodiment.

FIG. 9 is a diagram for describing software modules of the image forming apparatus 101 according to the first embodiment. Each software module shown here is realized mainly by the CPU 301 executing a program expanded in the RAM 302.

A job control processing module 901 performs overall control of the software modules, and performs control of a print processing module 904, a UI processing module 902 and the like that relates to all jobs arising inside the image forming apparatus 101. The UI processing module 902 mainly performs control relating to the console unit 202 and the console unit I/F 306. The UI processing module 902 notifies contents input by the operator via the console unit 202 to the job control processing module 901, and controls display contents of the display screen of the console unit 202, based on instructions from the job control processing module 901. Also, the UI processing module 902 controls processing such as editing of drawing data for display on the console unit 202. A network processing module 903 is a module that mainly controls communication with the outside performed via the network I/F 307, and performs communication control with respective devices on the network 103. The network processing module 903, upon receipt of a control command or data from an external device via the network 103, notifies the contents thereof to the job control processing module 901. Also, the network processing module 903 transmits control commands and data to an external device via the network 103, based on instructions from the job control processing module 901. The print processing module 904 controls the image processing unit 309, the print processing unit 312 and the printer 314 to execute designated image processing and perform print processing based on instructions of the job control processing module 901. The print processing module 904 receives information such as image data, image information (size, color mode, resolution, etc. of image data), layout information (offset, scaling, imposition, etc.), and paper information (size, print direction) from the job control processing module 901. The print processing module 904 controls the image processing unit 309 and the print processing unit 312 to perform appropriate image processing on image data, and controls the printer 314 to instruct printing to sheets. Also, the print processing module 904 obtains the status information of the print processing unit 312 and the printer 314, and notifies the acquired status information to the job control processing module 901.

Next, an operation for switching the mode, which is a characteristic control of the present embodiment, will be described.

Figure 10:
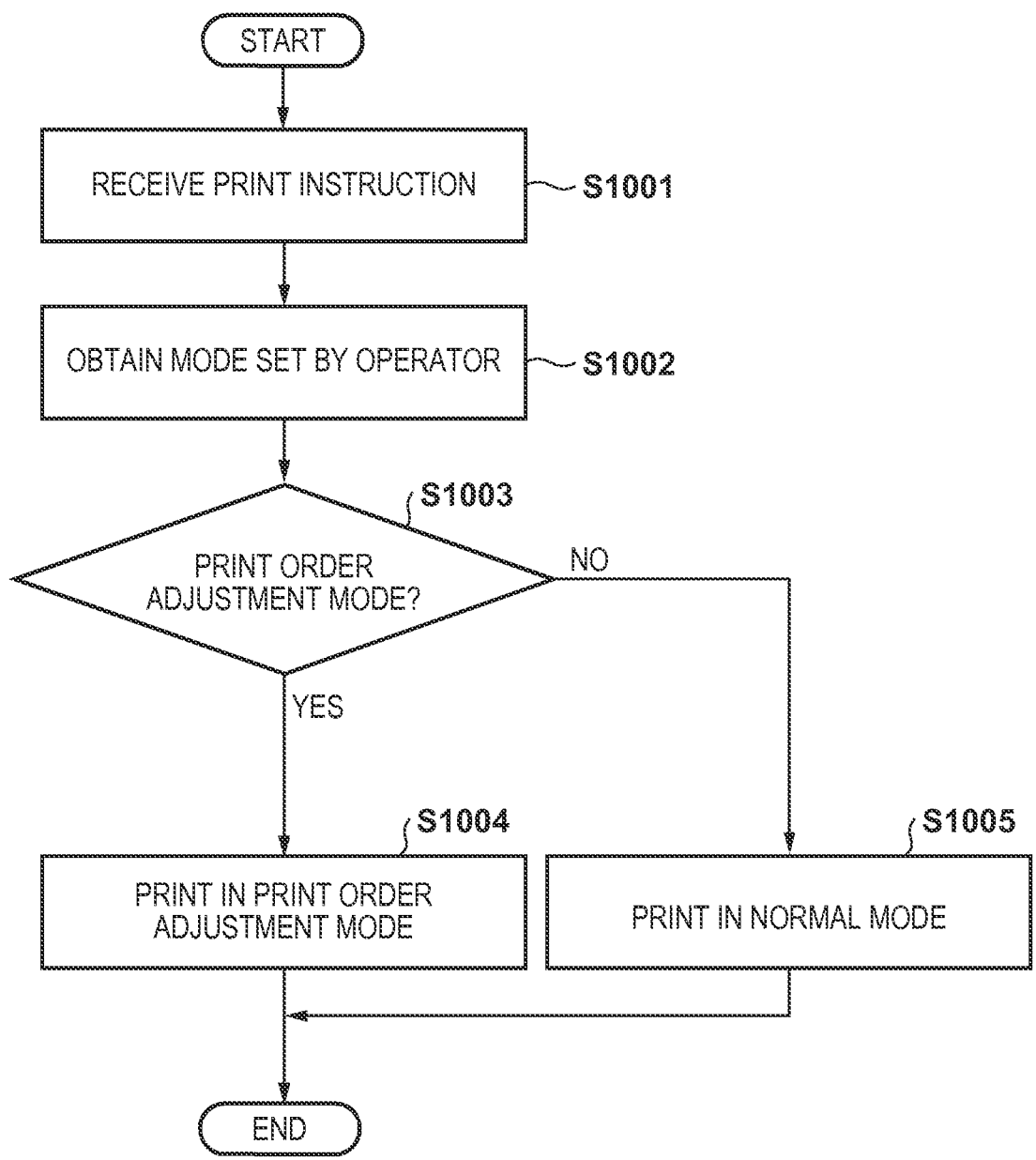
FIG. 10 is a flowchart for describing processing for switching the print mode in the image forming apparatus according to the first embodiment.

FIG. 10 is a flowchart for describing processing for switching the print mode in the image forming apparatus 101 according to the first embodiment. The processing shown in this flowchart is realized by the CPU 301 deploying a program installed on the HDD 304 in the RAM 302 and executing the program.

First, in step S1001, the CPU 301 receives a print instruction from the PC 102 or the like via the network 103 or a print instruction from the operator via the console unit 202. Next, proceeding to step S1002, the CPU 301 obtains information on the abovementioned normal mode or print order adjustment mode that is set via an operation screen which will be discussed later from the RAM 302.

Figure 11:
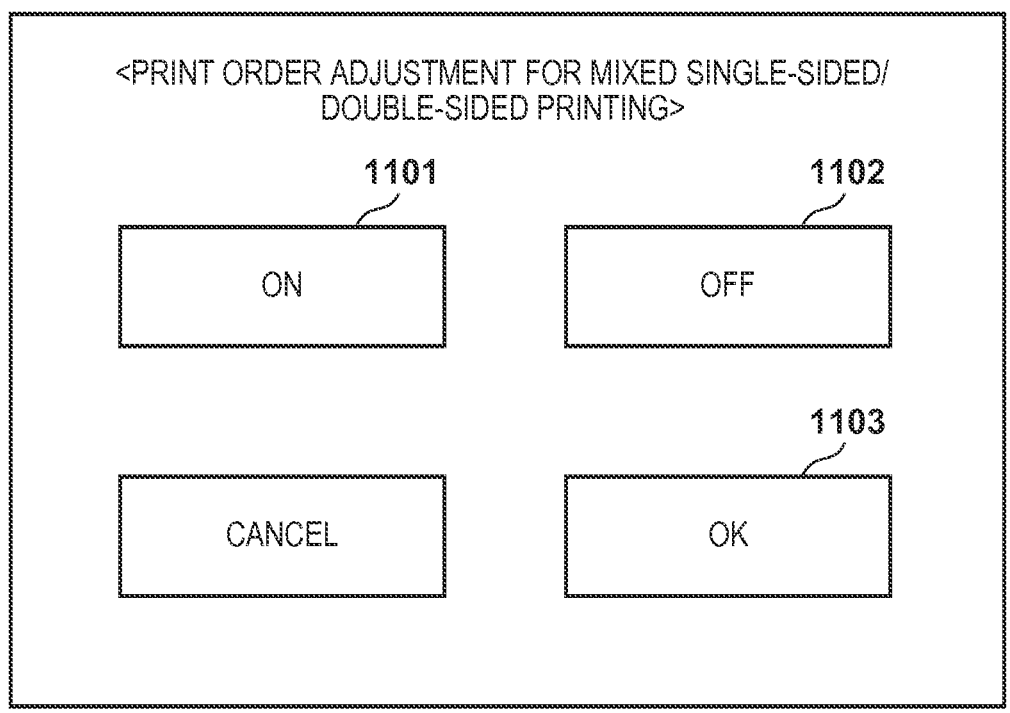
FIG. 11 depicts a view showing an example of an operation screen that is displayed on a console unit of the image forming apparatus according to the first embodiment.

FIG. 11 depicts a view showing an example of the operation screen that is displayed on the console unit 202 of the image forming apparatus 101 according to the first embodiment.

Via this operation screen, the operator is able to set the abovementioned print order adjustment mode to on or off. Here, the "print order adjustment mode" that was described with reference to FIGS. 7C and 8C is set when the operator selects an ON button 1101 and presses an OK button 1103. On the other hand, the "normal mode" that was described with reference to FIGS. 7B and 8B is set when the operator selects an OFF button 1102 and presses the OK button 1103. Note that the "print order adjustment mode" or the "normal mode" set on this operation screen is stored in the RAM 302.

Proceeding to step S1003, the CPU 301 determines whether or not the print order adjustment mode is set. Here, when the print order adjustment mode is not set, the processing proceeds to step S1005 and the CPU 301 executes printing in the "normal mode" that was described with reference to FIGS. 7B and 8B, for example (i.e., control for printing the first side of a subsequent double-sided printing page prior to a preceding single-sided printing page is not performed). On the other hand, in step S1003, the CPU 301, upon determining that the print order adjustment mode is set, proceeds to step S1004 and executes printing in the "print order adjustment mode" that was described with reference to FIGS. 7C and 8C, for example.

As described above, according to the first embodiment, the operator is able to shorten the time that is required for overall printing by selecting either the "print order adjustment mode" or the "normal mode".

For example, when the number of successive double-sided printing pages following a single-sided printing page is fewer (i.e., when 2 pages or 4 pages) than a predetermined number (6 pages), the time required for overall printing can thereby be shortened by selecting the "print order adjustment mode". Also, when the number of successive double-sided printing pages following a single-sided printing page is greater than or equal to the predetermined number (6 pages), the time required for overall printing can be shortened by selecting the "normal mode".

Second Embodiment

The first embodiment described a control for switching the print order in accordance with the "normal mode" or the "print order adjustment mode" designated by the operator. In contrast, the second embodiment describes a control for switching between the "normal mode" and the "print order adjustment mode" automatically according to the job. Note that because the configuration of the image forming apparatus 101 and the printing system according to the second embodiment is the same as the abovementioned first embodiment, description thereof will be omitted.

When the print order in the "print order adjustment mode" shown in FIG. 7C or FIG. 8C is employed, productivity may fall below the normal mode with a job in which single-sided printing pages are mixed with double-sided printing pages. This is due to the standby location for double-sided printing indicated by 503 in FIG. 5 being used as a conveyance path for inverting sheets that have undergone single-sided printing. Accordingly, for example, in a case such as shown in FIG. 5, printing of a plurality of successive double-sided printing pages will be executed in a state where there is one less standby location for double-sided printing than usual. Specifically, printing will take more time in the "print order adjustment mode" than in the "normal mode" when the number of successive double-sided printing pages following a single-sided printing page is six or more.

In view of this, in the second embodiment, an example in which the number of successive double-sided printing pages following a single-sided printing page is identified, in a job in which single-sided printing pages are mixed with double-sided printing pages, and the print mode is automatically switched between the "print order adjustment mode" and the "normal mode" will be described.

Figure 12:
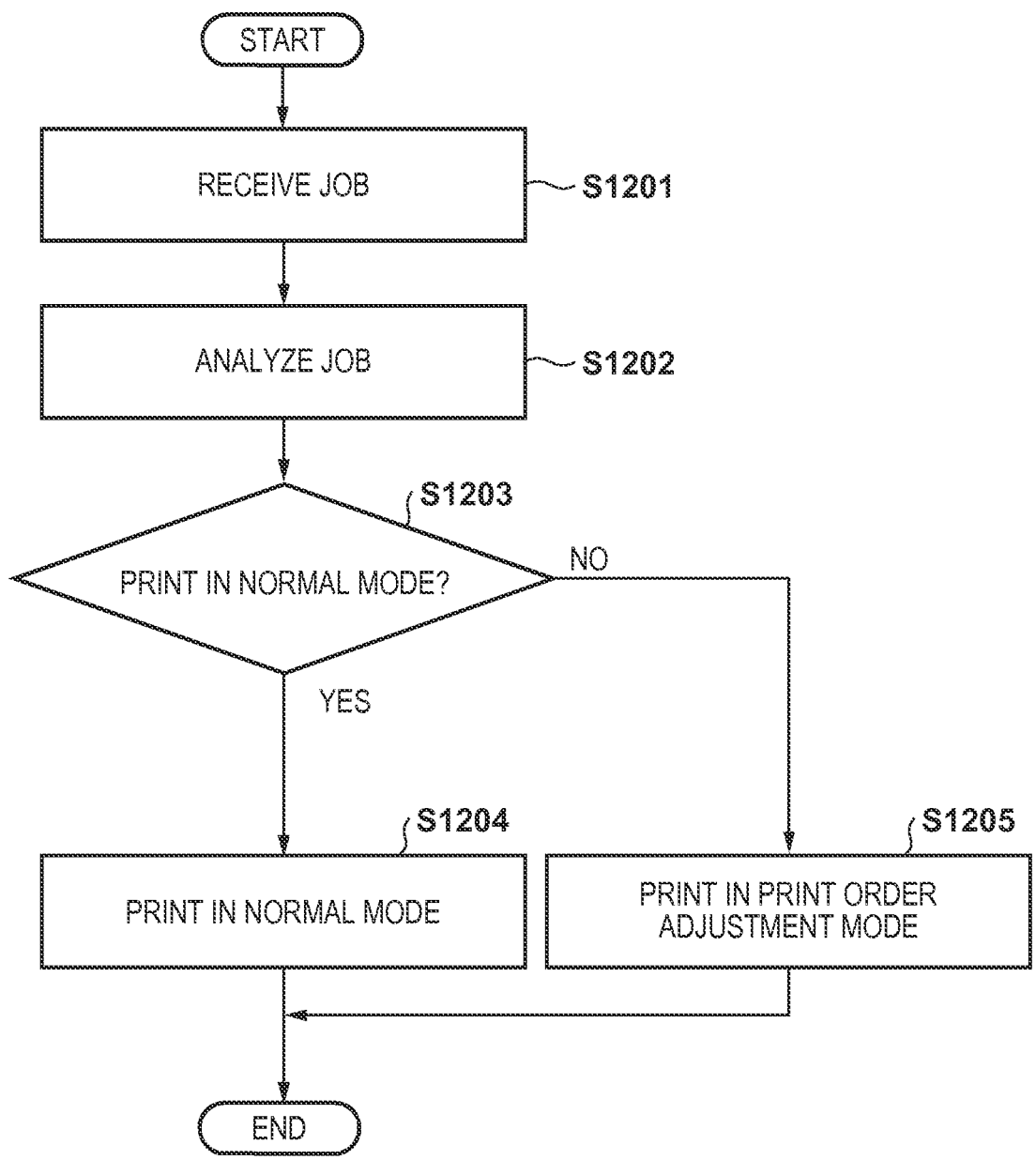
FIG. 12 is a flowchart for describing processing for switching the print mode in the image forming apparatus according to a second embodiment of the present invention.

FIG. 12 is a flowchart for describing processing for switching the print mode in the image forming apparatus 101 according to the second embodiment. The processing shown in this flowchart is realized by the CPU 301 deploying a program installed on the HDD 304 in the RAM 302 and executing the program.

In step S1201, the CPU 301 receives a print job from the printer driver via the network 103 or a print job input from the console unit 202. Proceeding to step S1202, the CPU 301 then analyzes the print job. Next, proceeding to step S1203, the CPU 301 checks the order in which the single-sided printing pages and the double-sided printing pages included in the print job are arranged. The CPU 301 then determines whether to print the print job in the "normal mode" described with reference to FIGS. 7B and 8B or in the "print order adjustment mode" described with reference to FIGS. 7C and 8C. Here, when it is determined to print in the "normal mode", the processing proceeds to step S1204, and the CPU 301 executes printing in the order of the document data that is included in a print job, as shown in FIGS. 7B and 8B, for example.

On the other hand, in step S1203, the CPU 301, upon determining to print in the "print order adjustment mode", proceeds to step S1205, and executes printing in a print order such as shown in FIGS. 7C and 8C, for example, after changing the order of the document data that is included in the print job.

Next, the determination processing of step S1203 will be described. Here, the CPU 301 checks the print order of the respective pages that are included in the print job and the designation of single-sided printing or double-sided printing. The CPU 301 then checks the number of successive double-sided printing pages from the point in time that the print mode switches from single-sided printing to double-sided printing during this print job. Here, if the number of successive double-sided printing pages is fewer than a predetermined value, it is determined that it is efficient to print in the "print order adjustment mode". On the other hand, if the number of successive double-sided printing pages is greater than or equal to the predetermined value, it is determined that the execution time of the print job can be shortened by printing in the "normal mode". Here, the predetermined value, in the case of the image forming apparatus 101 according to the second embodiment, is set to "6" according to the total number of standby locations (here, 3) and the number of standby locations that are additionally used for inverting sheets that have undergone single-sided printing (here, 1). Accordingly, in this second embodiment, in the case where the number of successive double-sided printing pages following a single-sided printing page is less than the predetermined value (less than 6), the "print order adjustment mode" is selected, and in the case where the number of successive double-sided printing pages following a single-sided printing page is greater than or equal to the predetermined value (6 or more), the "normal mode" is selected. Note that the predetermined value may be set to a value indicating the number of successive sheets for double-sided printing, rather than a value indicating the number of successive double-sided printing pages. The predetermined value in this case will be set to "3" (normal mode if 3 or more; print order adjustment mode is less than 3) in the case of the image forming apparatus 101, according to the total number of standby locations (here, 3) and the number of standby locations that are additionally used for inverting sheets that have undergone single-sided printing (here, 1).

According to the second embodiment as described above, printing can be executed after switching between the "print order adjustment mode" and the "normal mode" according to the print job, and thus the effect of being able to shorten the execution time of the print job can be obtained, even in the case of a print job in which single-sided printing is mixed with double-sided printing.

Note that by enabling the user to preset whether to execute control such as in the second embodiment, it is also possible to set printing to always be executed in the "normal mode", for example, irrespective of the print job.

Note that although the abovementioned embodiments described an image forming apparatus (printing apparatus) that receives and executes print jobs as an example, the present invention is not limited thereto, and can, for example, also be applied to a print control apparatus (PC 102, etc.) that transmits print jobs to a printing apparatus to be printed. In this case, the print control apparatus finds out the number of sheets that can standby in the printing apparatus, and outputs a print job in which single-sided printing pages are mixed with double-sided printing pages to the printing apparatus after changing the page order of the print job according to the order in which single-sided printing pages and double-sided printing pages are arranged in the print job. Similar effects to the abovementioned embodiments are also obtained in such a case.

Hereinafter, such a print control apparatus will be described.

Figure 13:
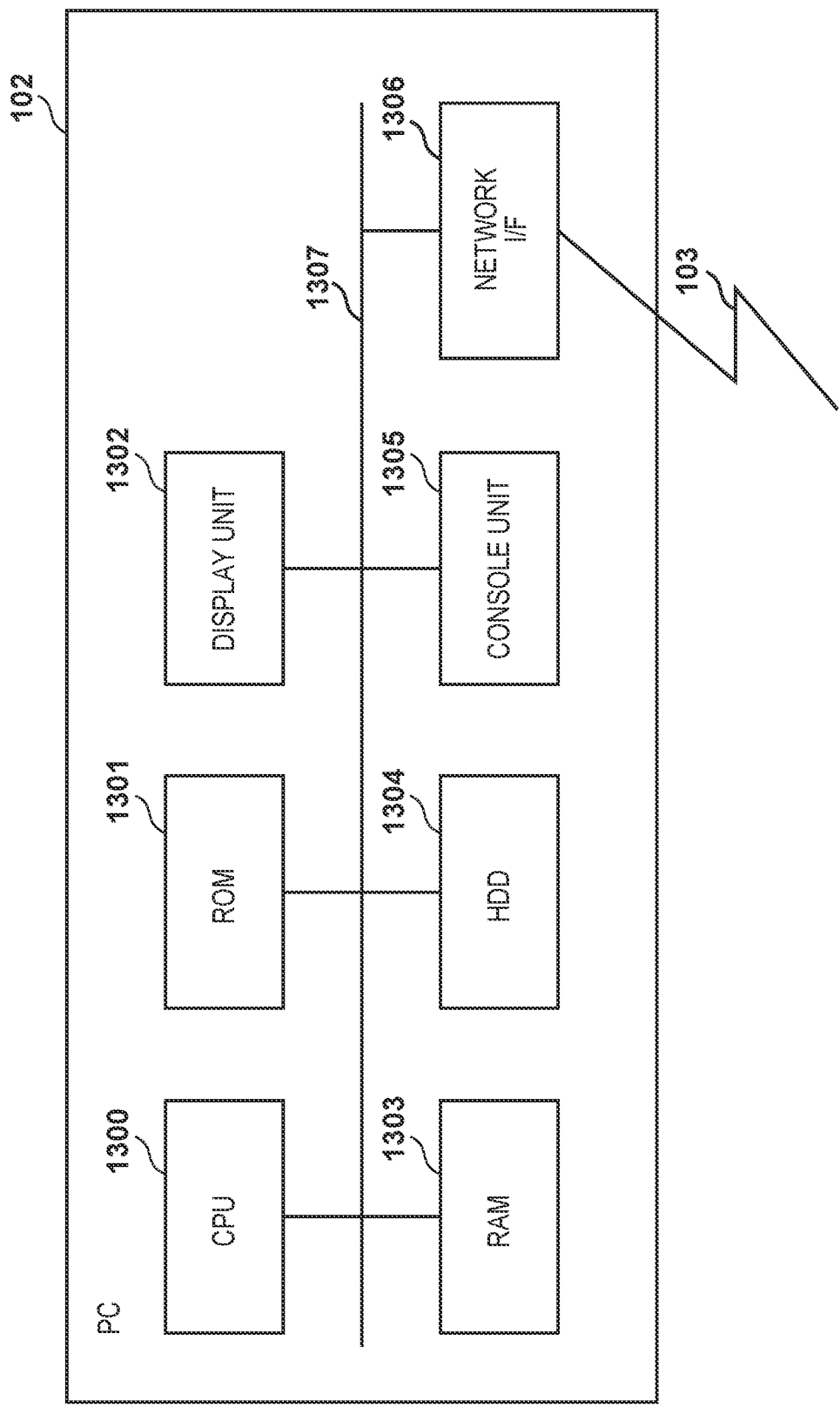
FIG. 13 is a block diagram for describing the configuration of a print control apparatus (PC) according to an embodiment.

FIG. 13 is a block diagram for describing the configuration of a print control apparatus (PC 102) according to an embodiment.

This PC 102 has a CPU 1300 serving as a control agent, a RAM 1303 that provides a work area and the like when the CPU 1300 is operating, a ROM 1301 that stores various data such as a boot program, and a HDD 1304 on which various programs and the like are installed. Furthermore, the PC 102 further has a display unit 1302, a console unit 1305, and a network interface 1306 that controls an interface with the network 103. These units are connected to the CPU 1300 via a bus 1307.

Figure 14:
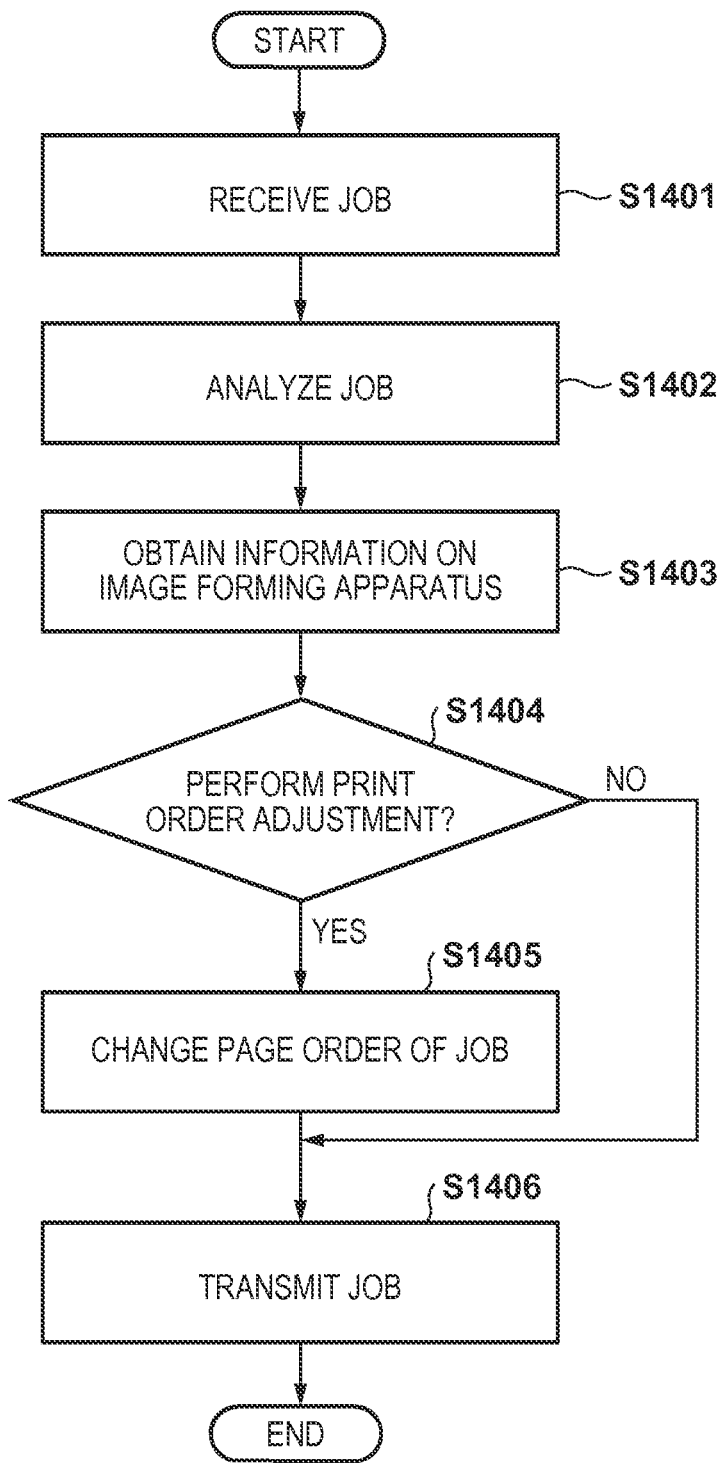
FIG. 14 is a flowchart for describing operations of a print control apparatus (PC) according to an embodiment.

FIG. 14 is a flowchart for describing processing by the print control apparatus (PC 102) according to this embodiment. Note that a program for executing the processing shown in this flowchart is installed on the HDD 1304, and this processing is achieved by the CPU 1300 executing the boot program stored in the ROM 1301, deploying the above program in the RAM 1303, and executing the program.

First, when the CPU 1300 receives a print job via the console unit 1305 or the network I/F 1306 in step S1401, the processing proceeds to step S1402 and the CPU 1300 analyzes the print job. Next, proceeding to step S1403, the CPU 1300 obtains information on the image forming apparatus 101 connected via the network 103. Here, as described above in relation to FIG. 5, information such as the number of sheet standby locations for use in double-sided printing and the like or whether sheets that have undergone single-sided printing need to be inverted upside down before being discharged is obtained. Next, proceeding to step S1404, the CPU 1300 determines whether or not to change the print order of the pages included in the print job, that is, whether to print in the aforementioned "normal mode" or "print order adjustment mode". Here, if it is determined to print in the "normal mode", the processing proceeds to step S1406, and the CPU 1300 transmits the print job to the image forming apparatus 101 to be printed without changing the original document data of the job.

On the other hand, if the CPU 1300 determines at step S1404 to print in the "print order adjustment mode" in which the print order is changed, the processing proceeds to step S1405. In step S1405, the CPU 1300, in the case of a print job for printing sheets such as shown in FIG. 8A, for example, rearranges the document data in the following order: second page (front side), fourth page (front side), first page (one side), third page (back side), sixth page (front side), fifth page (back side), and seventh page (back side). This is determined based on the configuration of the image forming apparatus 101 obtained in step S1403 and the result of analyzing the print job. Job data is then created in which front/back-side attributes shown in parentheses above are attached to the data of the respective pages. In step S1406, the CPU 1300 then transmits the created print job to the image forming apparatus 101 to be printed.

In this case, the image forming apparatus 101, upon receiving a print job, is able to execute printing such as shown in FIG. 8B, for example, simply by printing the document data included in the print job based on the order of the document data that is included in the print job and whether the data is for the front side or the back side of the sheet. Accordingly, in this case, the print data does not need to be rearranged in the image forming apparatus 101.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-178509, filed Sep. 2, 2014, which is hereby incorporated by reference herein in its entirety.

What is claimed is:

1. A printing apparatus capable of double-sided printing and single-sided printing, comprising:
   a selection unit that selects, with regard to a print job for including a single-sided printing page and double-sided printing pages following the single-sided printing page,
   (i) a first print control in which printing of a page which is included in the double-sided printing pages and to be printed on a first surface of a sheet and printing of a page which is included in the double-sided printing pages and to be printed on a second surface of the sheet are performed after printing of the single-sided printing page, or
   (ii) a second print control in which printing of the page which is to be printed on the first surface of the sheet is performed before printing of the single-sided printing page and printing of the page which is to be printed on the second surface of the sheet is performed after printing of the single-sided printing page,
   based on a number of successive double-sided printing pages following the single-sided printing page in the print job; and
   a control unit configured to execute, when a print job for including a single-sided printing page and double-sided printing pages following the single-sided printing page is input, the print job according to the first print control or the second print control selected by the selecting unit.

2. The printing apparatus according to claim 1, wherein the selection unit selects the first print control in a case where the number of successive double-sided printing pages following the single-sided printing page in the print job is greater than a predetermined value, and selects the second print control in a case where the number of successive double-sided printing pages following the single-sided printing page in the job is less than the predetermined value.

3. The printing apparatus according to claim 1, further comprising:
   a first conveyance path for inverting a sheet that has undergone single-sided printing upside down and discharging the inverted sheet to outside the printing apparatus, and a second conveyance path for conveying a sheet of which one side been printed in double-sided printing to a printing position of the printing apparatus; and
   a plurality of standby locations for allowing a sheet of which only one side of double-sided printing has been printed to standby,
   wherein the control unit, in the second print control, executes printing that uses fewer standby locations than in the first print control.

4. The printing apparatus according to claim 3, wherein the control unit, in the first print control, performs control, in a state where sheets of which only one side has been printed in double-sided printing are standing by at all of the plurality of standby locations, to execute printing on a back side of a foremost sheet, among the sheets of which only one side has been printed that are standing by, and to convey a following sheet of which only one side has been printed in double-sided printing to the standby location that is vacated.

5. A method of controlling a printing apparatus capable of double-sided printing and single-sided printing, comprising:
   selecting, with regard to a print job for including a single-sided printing page and double-sided printing pages following the single-sided printing page,
   (i) a first print control in which printing of a page which is included in the double-sided printing pages and to be printed on a first surface of a sheet and printing of a page which is included in the double-sided printing pages and to be printed on a second surface of the sheet are performed after printing of the single-sided printing page, or
   (ii) a second print control in which printing of the page which is to be printed on the first surface of the sheet is performed before printing of the single-sided printing page and printing of the page which is to be printed on the second surface of the sheet is performed after printing of the single-sided printing page,
   based on a number of successive double-sided printing pages following the single-sided printing page in the print job; and
   executing, when a print job for including a single-sided printing page and double-sided printing pages following the single-sided printing page is input, the print job according to the first print control or the second print control selected in the selecting.

6. A non-transitory computer-readable storage medium storing a program that causes a computer to perform a method for controlling a printing apparatus capable of double-sided printing and single-sided printing, the method comprising:
   selecting, with regard to a print job for including a single-sided printing page and double-sided printing pages following the single-sided printing page,
   (i) a first print control in which printing of a page which is included in the double-sided printing pages and to be printed on a first surface of a sheet and printing of a page which is included in the double-sided printing pages and to be printed on a second surface of the sheet are performed after printing of the single-sided printing page, or
   (ii) a second print control in which printing of the page which is to be printed on the first surface of the sheet is performed before printing of the single-sided printing page and printing of the page which is to be printed on the second surface of the sheet is performed after printing of the single-sided printing page,
based on a number of successive double-sided printing pages following the single-sided printing page in the print job; and
executing, when a print job for including a single-sided printing page and double-sided printing pages following the single-sided printing page is input, the print job according to the first print control or the second print control selected in the selection.

\* \* \* \* \*